US012644370B2

(12) United States Patent
Shao et al.

(10) Patent No.: US 12,644,370 B2
(45) Date of Patent: **\*Jun. 2, 2026**

(54) RIG STATE DETECTION USING VIDEO DATA

(71) Applicant: Schlumberger Technology Corporation, Sugar Land, TX (US)

(72) Inventors: Laetitia Shao, Menlo Park, CA (US); Suhas Suresha, Menlo Park, CA (US); Indranil Roychoudhury, Menlo Park, CA (US); Crispin Chatar, Menlo Park, CA (US); Soumya Gupta, Menlo Park, CA (US); Jose Celaya Galvan, Menlo Park, CA (US)

(73) Assignee: Schlumberger Technology Corporation, Sugar Land, TX (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/936,194

(22) Filed: Nov. 4, 2024

(65) Prior Publication Data

US 2025/0118073 A1     Apr. 10, 2025

Related U.S. Application Data

(63) Continuation of application No. 17/995,324, filed as application No. PCT/US2021/025757 on Apr. 5, 2021, now Pat. No. 12,136,267.

(Continued)

(51) Int. Cl.
*E21B 44/00*          (2006.01)
*G06N 3/08*          (2023.01)
(Continued)

(52) U.S. Cl.
CPC .............. *E21B 44/00* (2013.01); *G06N 3/08* (2013.01); *E21B 19/00* (2013.01); *E21B 21/065* (2013.01); *E21B 2200/22* (2020.05)

(58) Field of Classification Search
CPC ........ E21B 44/00; E21B 19/00; E21B 21/065; E21B 2200/22; G06N 3/08
See application file for complete search history.

(56) References Cited

U.S. PATENT DOCUMENTS 9,850,712 B2    12/2017  Sugiura
10,451,757 B2   10/2019  Zhang
(Continued)

FOREIGN PATENT DOCUMENTS

WO          2018038963 A1    3/2018
WO      WO-2020150345 A1 *   7/2020    ........... E21B 19/165

OTHER PUBLICATIONS

Arnaout, A., et al. "Intelligent Real-time Drilling Operations Classification Using Trend Analysis of Drilling Rig Sensors Data", SPE 163302, presented at the SPE Kuwait International Petroleum Conference and Exhibition, Kuwait City, Kuwait, 2012, 9 pages.

(Continued)

*Primary Examiner* — Robert E Fuller
(74) *Attorney, Agent, or Firm* — Kyle R. Miiller

(57)          ABSTRACT

A method includes receiving training images representing a portion of a drilling rig over a first period of time, associating individual training images of the training images with times at which the individual training images were captured, determining a rig state at each of the times, classifying the individual training images based on the rig state at each of the times, training a machine learning model to identify rig state based on the classified training images, receiving additional images representing the portion of the drilling rig over a second period of time, and determining one or more rig states of the drilling rig during the second period of time using the machine learning model based on the additional images.

19 Claims, 11 Drawing Sheets

Related U.S. Application Data

(60) Provisional application No. 63/004,542, filed on Apr. 3, 2020.

(51) Int. Cl.
    *E21B 19/00*        (2006.01)
    *E21B 21/06*        (2006.01)

(56) References Cited

U.S. PATENT DOCUMENTS

| | | | | |
|---|---|---|---|---|
| 2013/0275100 | A1* | 10/2013 | Ellis | E21B 19/20 |
| | | | | 703/2 |
| 2015/0310894 | A1 | 10/2015 | Stieglitz | |
| 2016/0130889 | A1* | 5/2016 | Torrione | G01B 11/08 |
| | | | | 348/135 |
| 2016/0130917 | A1 | 5/2016 | Torrione | |
| 2017/0056928 | A1* | 3/2017 | Torrione | B07B 1/42 |
| 2019/0100988 | A1* | 4/2019 | Ellis | G01B 11/043 |
| 2019/0136650 | A1* | 5/2019 | Zheng | E21B 3/02 |
| 2019/0147125 | A1 | 5/2019 | Yu | |
| 2020/0126386 | A1* | 4/2020 | Michalopulos | G06T 17/00 |
| 2020/0224525 | A1* | 7/2020 | Parmeshwar | E21B 44/00 |
| 2020/0272823 | A1* | 8/2020 | Liu | G06F 18/24317 |
| 2021/0000404 | A1* | 1/2021 | Wang | A61B 5/7275 |
| 2021/0049351 | A1* | 2/2021 | Hosoi | G06V 10/772 |
| 2022/0172373 | A1 | 6/2022 | Mourao | |
| 2022/0270227 | A1 | 8/2022 | Affleck | |

OTHER PUBLICATIONS

Huval, B. et al., "An Empirical Evaluation of Deep Learning on Highway Driving ", arXiv:1504.01716v3, 2015, 7 pages.

Gulshan, V. et al. "Development and Validation of a Deep Learning Algorithm for Detection of Diabetic Retinopathy in Retinal Fundus Photographs", JAMA, 2016, 316 (22), pp. 2402-2410.

He, K. et al. "Spatial Pyramid Pooling in Deep Convolutional Networks for Visual Recognition", IEEE Transactions on Pattern Analysis and Machine Intelligence, 2015, 37(9), pp. 1904-1916.

Howard, A. G.., et al. "Mobilenets: Efficient Convolutional Neural Networks for Mobile Vision Applications", arXiv preprint arXiv:1704. 04861, 2017, 9 pages.

Krizhevsky, A. et al., "ImageNet Classification with Deep Convolutional Neural Networks", Proceedings of the 25th International Conference on Neural Information Processing Systems, Lake Tahoe, Nevada, USA., 2012, pp. 1-9.

Long, J. et al., "Fully Convolutional Networks for Semantic Segmentation", Proceedings of the IEEE Conference on Computer Vision and Pattern Recognition, 2015, 10 pages.

Ranjan, A. et al., "Optical flow Estimation using a Spatial Pyramid Network", Proceedings of the IEEE Conference on Computer Vision and Pattern Recognition, 2017, 10 pages.

Ren, S., et al. "Faster R-CNN: Towards Real-Time Object Detection with Region Proposal Networks", Advances in Neural Information Processing Systems, 2015, 9 pages.

Simonyan, K. et al., "Very Deep Convolutional Networks for Large-Scale Image Recognition", ICLR 2015, 14 pages.

Simonyan, K., "Two-Stream Convolutional Networks for Action Recognition in Videos", Advances in Neural Information Processing Systems, 2014, 9 pages.

Tran, D. et al. "Learning Satiotemporal Features with 3D Convolutional Networks", Proceedings of the IEEE International Conference on Computer Vision, 2015, 9 pages.

Search Report and Written Opinion of International Patent Application No. PCT/US2021/025757 dated Jul. 23, 2021, 12 pages.

International Preliminary Report on Patentability of International Patent Application No. PCT/US2021/025757 dated Oct. 13, 2022, 7 pages.

Extended Search Report issued in European Patent Application No. 21781939.0 dated Mar. 14, 2024, 8 pages.

Hegde, C. et al., "Application of Real-time Video Streaming and Analytics to Breakdown Rig Connection Process", presented at the Offshore Technology Conference, Houston, Texas, USA, 2018, 14 pages.

* cited by examiner

202

204

Video data            Sensor data

Frame
extraction

Time
extraction

01/02/2019 20:34:41 →

| Data | RPM | Flow | ... |
|---|---|---|---|
| 01/02/2019 20:34:41 | 42.0 | 1337 | ... |
| 01/02/2019 20:34:42 | 41.0 | 1338 | ... |

Class inference

| Data | Class |
|---|---|
| 01/02/2019 20:34:41 | Rotary Drilling |
| 01/02/2019 20:34:42 | Rotary Drilling |

1000

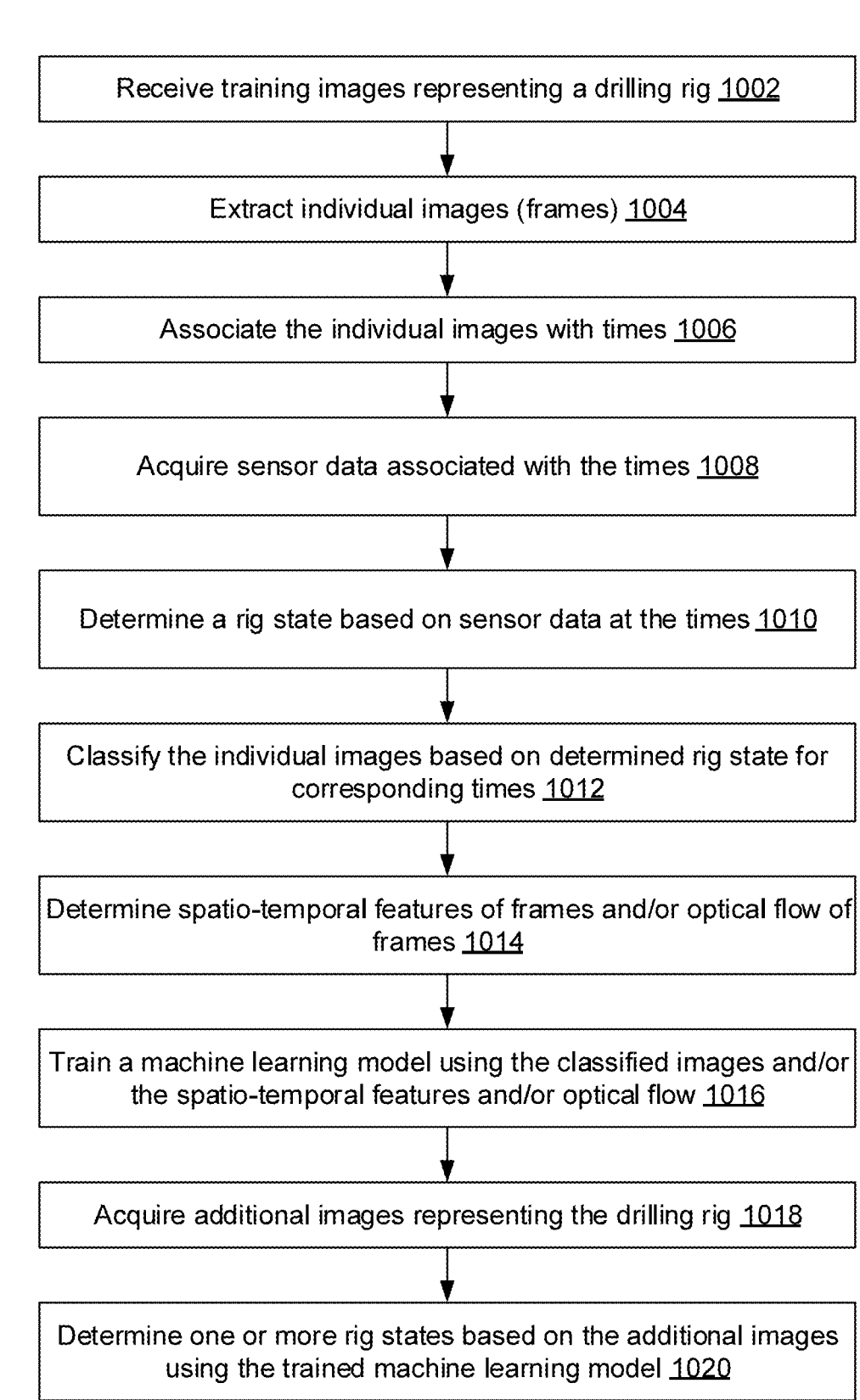

Receive training images representing a drilling rig 1002

Extract individual images (frames) 1004

Associate the individual images with times 1006

Acquire sensor data associated with the times 1008

Determine a rig state based on sensor data at the times 1010

Classify the individual images based on determined rig state for corresponding times 1012

Determine spatio-temporal features of frames and/or optical flow of frames 1014

Train a machine learning model using the classified images and/or the spatio-temporal features and/or optical flow 1016

Acquire additional images representing the drilling rig 1018

Determine one or more rig states based on the additional images using the trained machine learning model 1020

FIG. 10

RIG STATE DETECTION USING VIDEO DATA

CROSS-REFERENCE TO RELATED APPLICATIONS

This application is a continuation of U.S. patent application Ser. No. 17/995,324, which was filed on Oct. 3, 2022, issued as U.S. Pat. No. 12,136,267, which is a national stage of PCT Patent Application No. PCT/US2021/025757, which was filed on Apr. 5, 2021 which claims priority to U.S. Provisional Patent Application No. 63/004,542, which was filed on Apr. 3, 2020, each of which is hereby incorporated by reference in its entirety.

BACKGROUND

Rig state detection is a building block for drilling operations analysis. Currently, detection algorithms rely on data collected by sensors installed on the rig. However, relying on sensor data is problematic because sensor data are prone to failure and are expensive to maintain and install.

SUMMARY

Embodiments of the disclosure may provide a method including receiving training images representing a portion of a drilling rig over a first period of time, associating the training images with times at which the individual training images were captured, determining a rig state at each of the times, classifying the training images based on the rig state at each of the times, training a machine learning model to identify rig state based on the classified training images, receiving additional images representing the portion of the drilling rig over a second period of time, and determining one or more rig states of the drilling rig during the second period of time using the machine learning model based on the additional images.

Embodiments of the disclosure may also provide a computing system including one or more processors, and a memory system including one or more non-transitory, computer-readable media storing instructions that, when executed by at least one of the one or more processors, cause the computing system to perform operations. The operations include receiving training images representing a portion of a drilling rig over a first period of time, associating the training images with times at which the individual training images were captured, determining a rig state at each of the times, classifying the training images based on the rig state at each of the times, training a machine learning model to identify rig state based on the classified training images, receiving additional images representing the portion of the drilling rig over a second period of time, and determining one or more rig states of the drilling rig during the second period of time using the machine learning model based on the additional images.

Embodiments of the disclosure may further provide a non-transitory, computer-readable media storing instructions that, when executed by one or more processors of a computing system, cause the computing system to perform operations. The operations include receiving training images representing a portion of a drilling rig over a first period of time, associating the training images with times at which the individual training images were captured, determining a rig state at each of the times based on sensor data representing one or more rig parameters associated with the times, classifying the training images based on the rig state at each of the times, training a machine learning model to identify rig state based on the classified training images, receiving additional images representing the portion of the drilling rig over a second period of time, and determining one or more rig states of the drilling rig during the second period of time using the machine learning model and the additional images, and not using sensor data that represents rig parameters.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 2A illustrates a view captured by a camera facing a shaker, and FIG. 2B illustrates a view captured by a camera facing drill pipe (e.g., the "stick" or "stickup").

FIG. 10 illustrates a flowchart of a method for classifying rig state, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
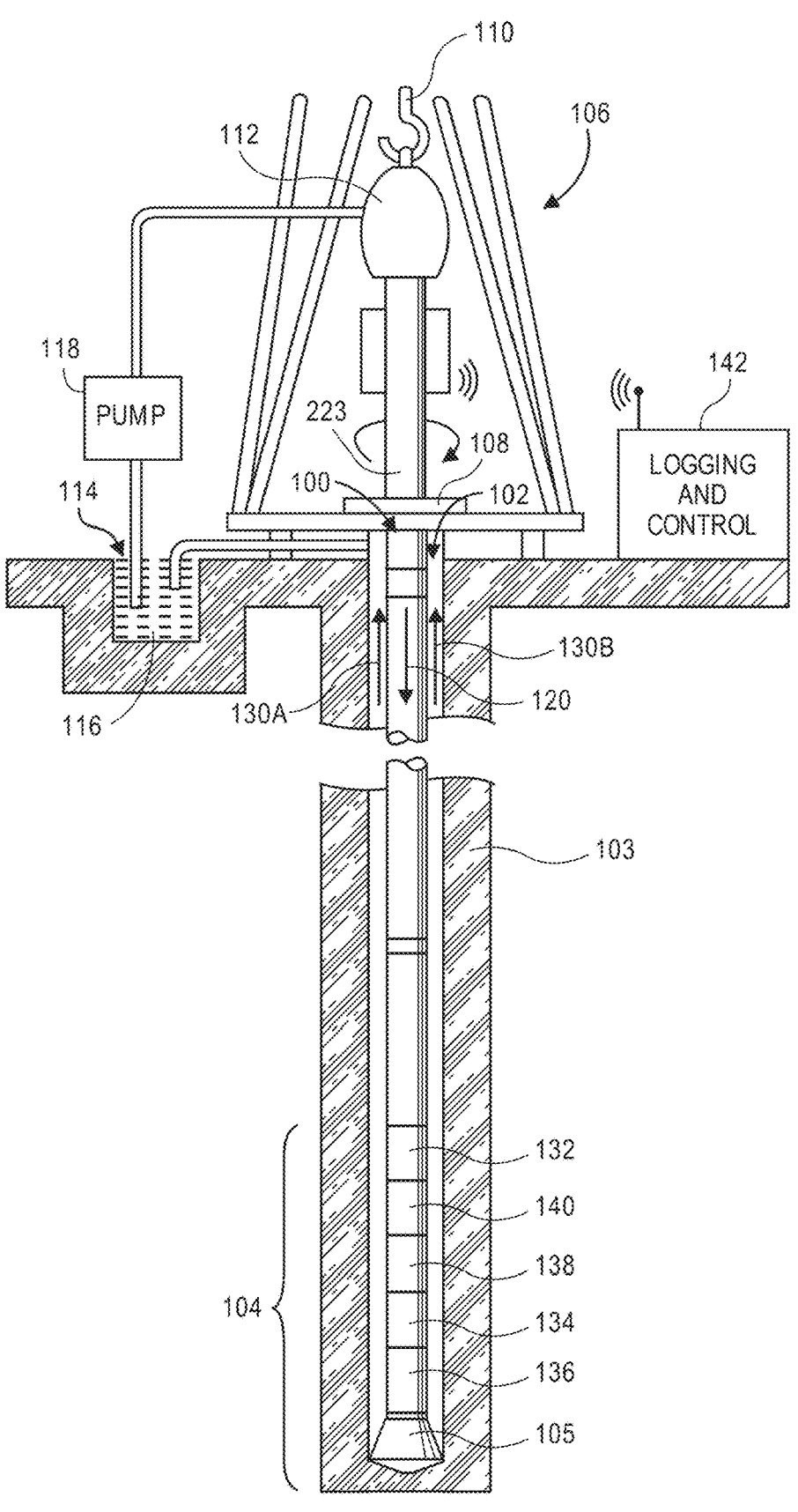
FIG. 1 illustrates an example of a wellsite system, according to an embodiment.

FIG. 1 illustrates a wellsite system according to examples of the present disclosure. The wellsite can be onshore or offshore. In this example system, a drill string 100 is suspended in a bore 102 formed in subsurface formations 103. The drill string 100 has a bottom hole assembly (BHA) 104 which includes a drill bit 105 at its lower end. A surface system 106 includes platform and derrick assembly positioned over the borehole 102, the assembly including a rotary table 108, kelly (not shown), hook 110, and rotary swivel 112. The drill string 100 is rotated by the rotary table 108 energized by a driver, which engages the kelly (not shown) at the upper end of the drill string 100. The drill string 100 is suspended from the hook 110, attached to a traveling block (also not shown), through the kelly (not shown) and the rotary swivel 112 which permits rotation of the drill string 100 relative to the hook 110. A top drive system could be used instead of the rotary table system shown in FIG. 1.

In the illustrated example, the surface system 106 further includes drilling fluid or mud 114 stored in a pit 116 formed at the well site. A pump 118 delivers the drilling fluid to the interior of the drill string 100 via a port (not shown) in the swivel 112, causing the drilling fluid to flow downwardly through the drill string 100 as indicated by the directional arrow 120. The drilling fluid exits the drill string 100 via ports (not shown) in the drill bit 105, and then circulates upwardly through an annulus region between the outside of the drill string 100 and the wall of the borehole 102, as indicated by the directional arrows 130A and 130B. In this manner, the drilling fluid lubricates the drill bit 105 and carries formation cuttings up to the surface as it is returned to the pit 116 for recirculation.

The BHA 104 of the illustrated embodiment may include a measuring-while-drilling (MWD) tool 132, a logging-while-drilling (LWD) tool 134, a rotary steerable directional drilling system 136 and motor, and the drill bit 105. It will also be understood that more than one LWD tool and/or MWD tool can be employed, e.g., as represented at 138.

The LWD tool 134 is housed in a drill collar and can contain one or a plurality of logging tools. The LWD tool 134 may include capabilities for measuring, processing, and storing information, as well as for communicating with the surface equipment. In the present example, the LWD tool 134 may include one or more tools configured to measure, without limitation, electrical resistivity, acoustic velocity or slowness, neutron porosity, gamma-gamma density, neutron activation spectroscopy, nuclear magnetic resonance and natural gamma emission spectroscopy.

The MWD tool 132 is also housed in a drill collar and can contain one or more devices for measuring characteristics of the drill string and drill bit. The MWD tool 132 further includes an apparatus 140 for generating electrical power for the downhole system. This may typically include a mud turbine generator powered by the flow of the drilling fluid, it being understood that other power and/or battery systems may be employed. In the present embodiment, the MWD tool 132 may include one or more of the following types of measuring devices, without limitation: a weight-on-bit measuring device, a torque measuring device, a vibration measuring device, a shock measuring device, a stick slip measuring device, a direction measuring device, and an inclination measuring device. The power generating apparatus 140 may also include a drilling fluid flow modulator for communicating measurement and/or tool condition signals to the surface for detection and interpretation by a logging and control unit 142.

Embodiments of the disclosure may provide a method for applying video classification techniques to rig state classification. This may represent a movement away from the constraints imposed by relying solely on sensor data to classify rig state. In at least some embodiments, a machine learning model is trained to infer rig states based on or directly from optical images and/or video (for purposes of the remainder of present disclosure, "images" will be understood to refer to still images and/or video, depending on the context). The machine learning models may be or include deep learning convolutional neural network models. The images may be collected using cameras positioned at various locations on the rig floor, e.g., in locations selected to exhibit differences between rig states. Further, an annotation pipeline may be provided that processes the videos and automatically annotates them using previously obtained sensor data.

The machine-learning pipeline may include two parts. First, the annotation pipeline matches individual images of a video dataset to rig states. For example, the annotation pipeline may employ a convolutional neural network to extract date digits (e.g., visual timestamps) from the image and match the date of the video with corresponding sensor data. Further, different convolutional neural networks (spatial and temporal) may be trained to perform rig state prediction. The models may be, for example, trained on a dataset of potentially millions of pairs of images and rig states on a cloud platform using graphical processing units (GPUs).

Dataset Collection

One illustrative example of a dataset may be collected over two time periods, e.g., two different months. For purposes of demonstration, January and February of 2019 represent these time periods. Further, cameras capturing video from different viewpoints simultaneously may be employed. For example, one camera points to the shaker (FIG. 2A), and another points to the stick (e.g., the pipe being run into/out of the well) (FIG. 2B). The captured videos are used to create an annotated video dataset to train and test the machine learning models.

Dataset Annotation

Figure 3:
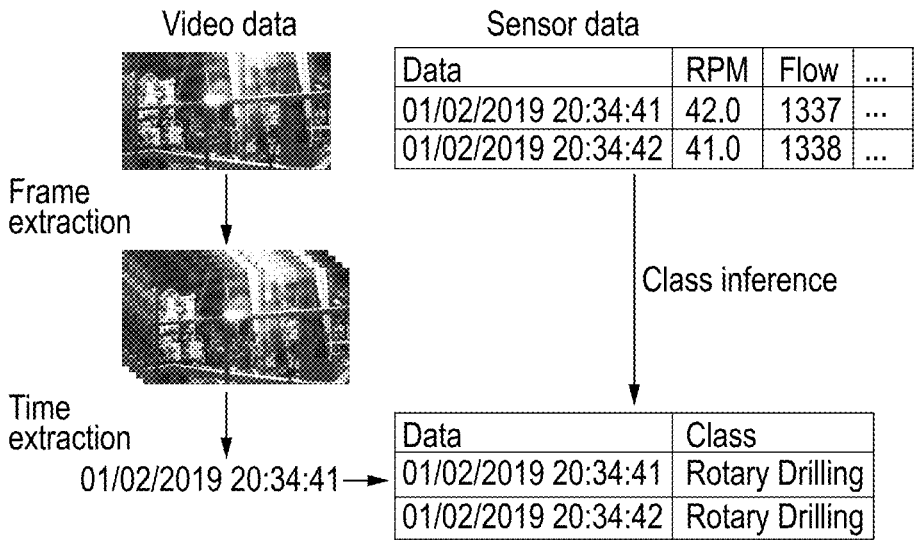
FIG. 3 illustrates a schematic view of an annotation pipeline, according to an embodiment.

The annotation pipeline, as schematically depicted in FIG. 3, may associate individual video frames with the corresponding rig state label, which may provide training pairs of frames and rig state labels. Inferring the rig state from video footage may call for expert knowledge, and datasets, such as those collected over a period of a month or more, may include many hours (e.g., 360 hours) of footage. Thus, rather than manual annotation, historical sensor data may be correlated to the video footage. For example, values of rotation per minute, flow, bit depth, hole depth, and hookload, or any other rig parameters, may be used to infer a rig state (e.g., select a rig state from a predetermined set of potential rig states) at a given timestamp.

Figure 2A:
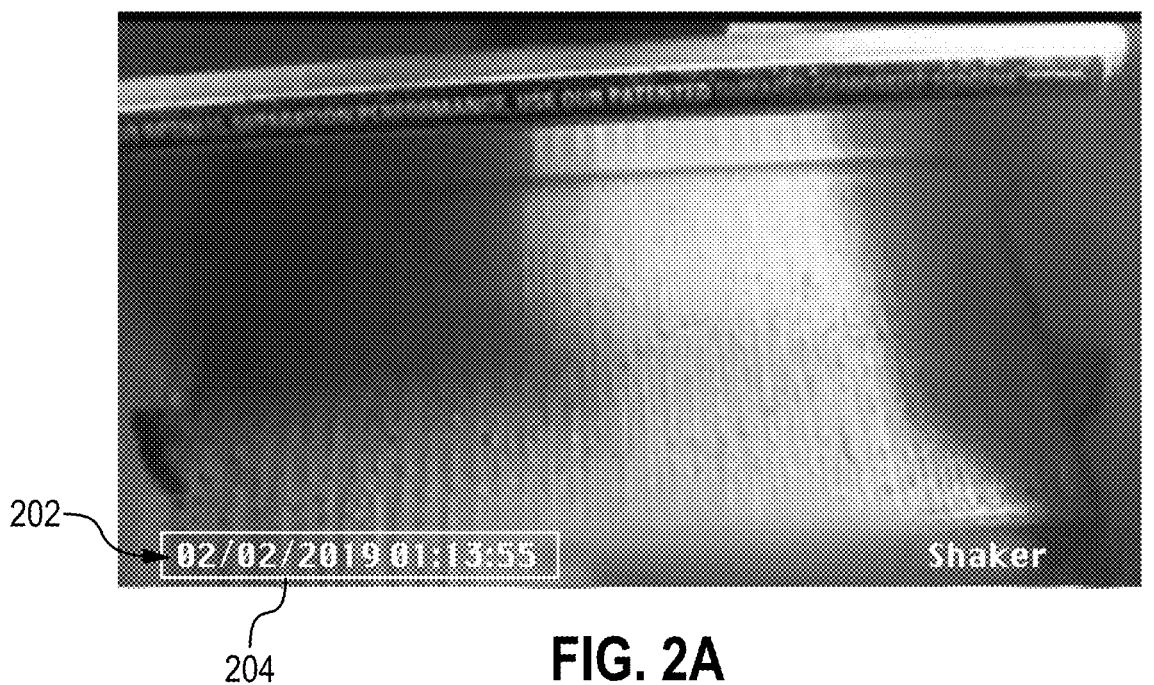
FIGS. 2A and 2B illustrate example images from the collected videos. Specifically.
Figure 2B:
Figure 4:
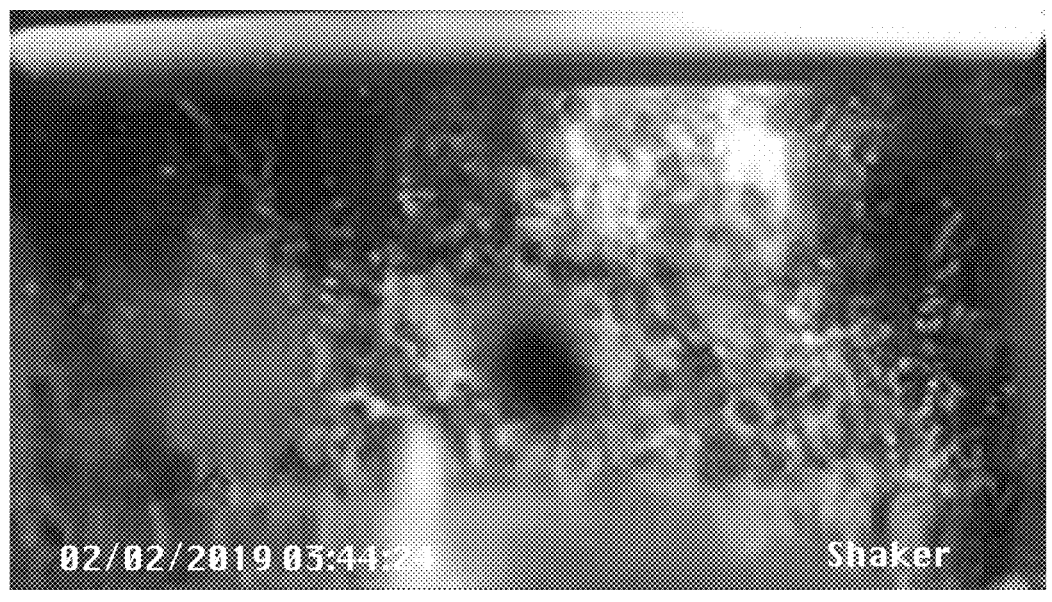
FIG. 4 illustrates an image in which the timestamp is obstructed by the background.

Referring specifically to FIG. 2A, in order to match an image to the corresponding label, the timestamp 202 displayed on the bottom left of the image may be extracted and noted. For example, a bounding box 204 around each digit may be (e.g., manually) defined at the beginning of the annotation process and a template matching algorithm may be used to identify each digit of the timestamp 202. An additional post-processing action may be applied to correct mistakes made by the algorithm due to obstructions that happen in the video, e.g., as shown in FIG. 4.

The annotation process may be refined by using the original template matching algorithm to automatically create a training corpus dataset to train a Convolutional Neural Network.

Accordingly, the data annotation pipeline creates two datasets. The first data set is from a first time period, e.g., the February dataset, which, for example, could include many (e.g., over a million) consecutive frames from two cameras/viewpoints (e.g., shaker and stick). The second data set is from a second time period, e.g., the January dataset, which may include a similar (e.g., a million or more) consecutive frames from two cameras/viewpoints (e.g., shaker and stick). Orientation and zoom may be different between the datasets. It will be appreciated that embodiments of the present method may be expanded to include any number of cameras and viewpoints, consistent with the present disclosure, with the use of two being just one specific example.

The two datasets may be split into a training set, a validation set, and a test set. For example, the proportions of the test sets may be 70/10/20 as a percent of the total of the two datasets, in one specific example. To split the dataset into three parts, the class repartition may be held roughly the same in all three subsets, such that statistical dependencies between the datasets are held relatively low. Accordingly, the dataset may be down-sampled by selecting one frame for every 10 frames, and dividing the frames into short clips, e.g., 5 minutes. The clips are then assigned at random to one of the three subsets.

Figure 5A:
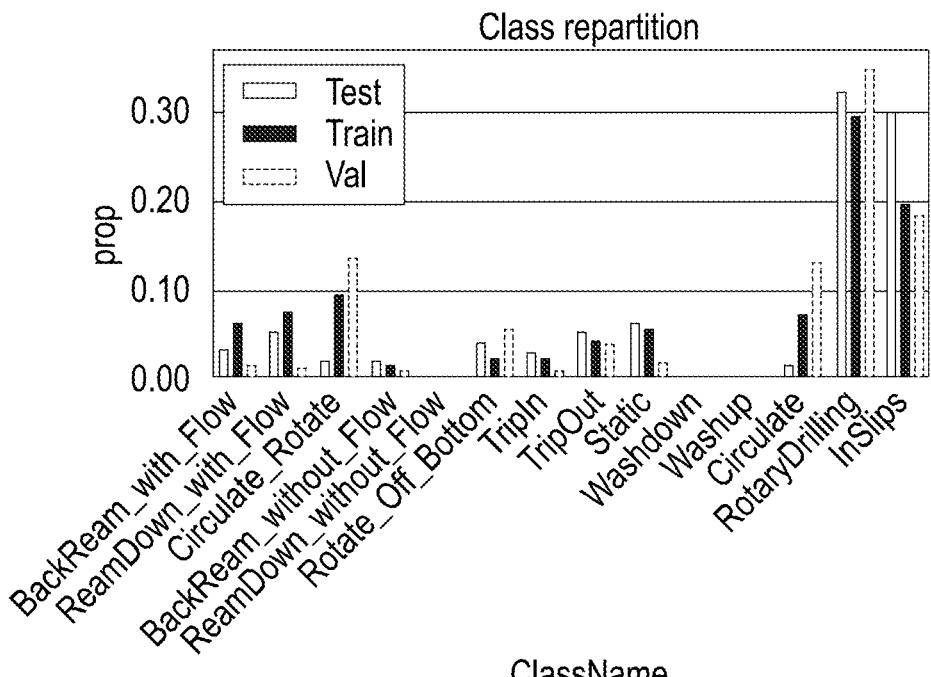
FIG. 5A illustrates an initial class repartition in a first dataset.
Figure 5B:
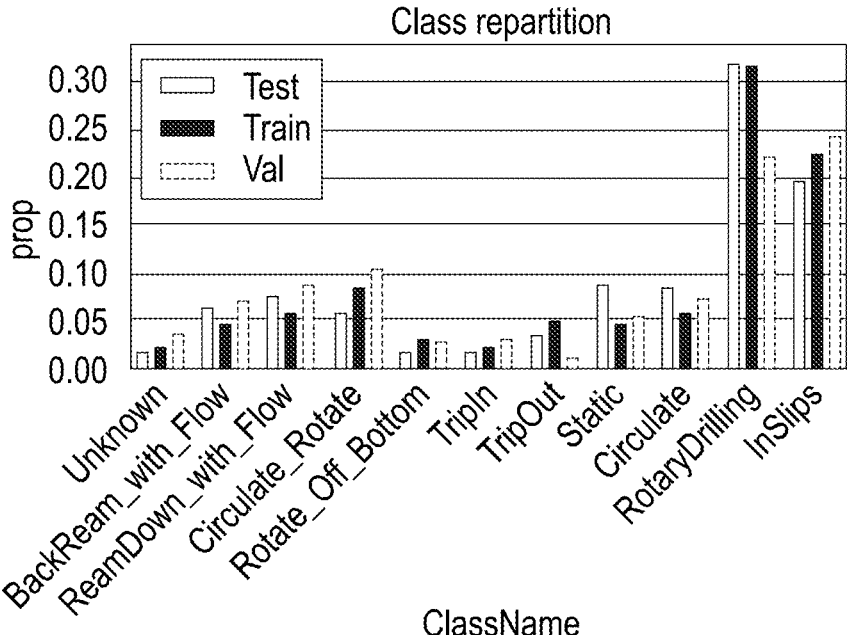
FIG. 5B illustrates a class repartition of the dataset of FIG. 5A, after merging minority classes, according to an embodiment.

As shown in FIG. 5A, the dataset may be imbalanced: more than 30% of the dataset is labelled as Rotary Drilling. In contrast, some classes are generally not, or are rarely, present: wash up and wash down, ream down and back ream without flow. These minority classes may be merged into an "Unknown" class. The dataset repartition is shown in FIG. 5B.

Models

In various embodiments, different architectures of convolutional neural networks may be employed. As a simple baseline, frame-by-frame classification that does not take into account temporal information may be used. For these frame-by-frame models, a visual geometry group (VGG) model may be used, pre-trained on a training image dataset (e.g., one or more public datasets) and fine-tuned using the training data established herein.

In another embodiment, to take into account temporal information, a convolutional 3D (C3D) model may be used. The C3D model may use 3D convolutions to learn spatio-temporal features in the same manner as 2D convolution networks learn spatial features. The input of this model is a stack of consecutive frames where the target frame is either the last frame, the first frame, or the middle frame. For example, if the target frame is the last one, the model has access to prior frames to determine the class at a given point, but not otherwise.

Figure 6A:
FIG. 6A illustrates an original image captured by a camera, according to an embodiment.
Figure 6B:
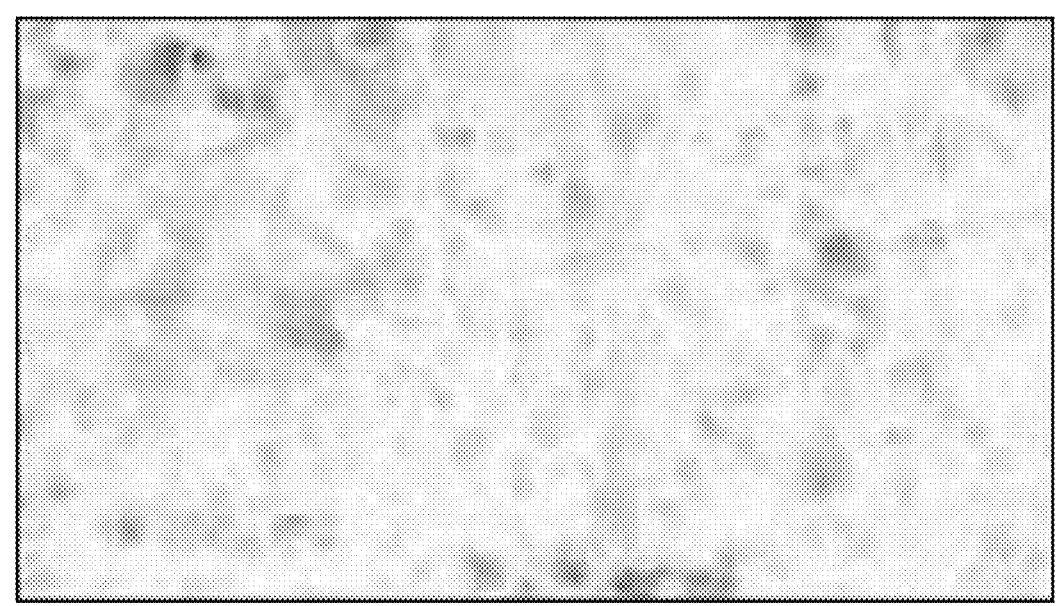
FIG. 6B illustrates a visualization of an optical flow, computed based on images captured by the camera that captured the image in FIG. 6A.
Figure 6C:
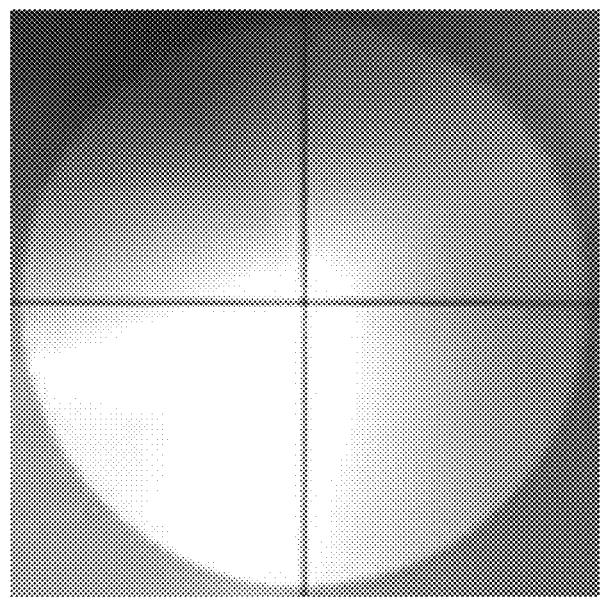
FIG. 6C illustrates a color wheel for interpretation. As applied to FIG. 6B, the optical flow reveals that the stick has an optical flow oriented downward.

Another model that takes into account temporal information is a two-stream model. The two-stream model explicitly uses optical flow to incorporate temporal information. Optical flow is a 2D vector field that represents the apparent motion of objects between two images taken consecutively in time. An example of the optical flow is visualized in FIGS. 6A-C. Optical flow images are typically in color, with the color of the image indicating the direction of the flow vector for a particular pixel and the intensity is proportional to the norm of the vector. Optical flow may be computed using a pre-trained Spatial Pyramid Network (SPyNet).

It will be appreciated that various other machine learning models may be suitable for use in embodiments of the present disclosure. The two models, optical flow and two-stream, discussed herein are merely two illustrative examples among many possibilities.

Figure 7:
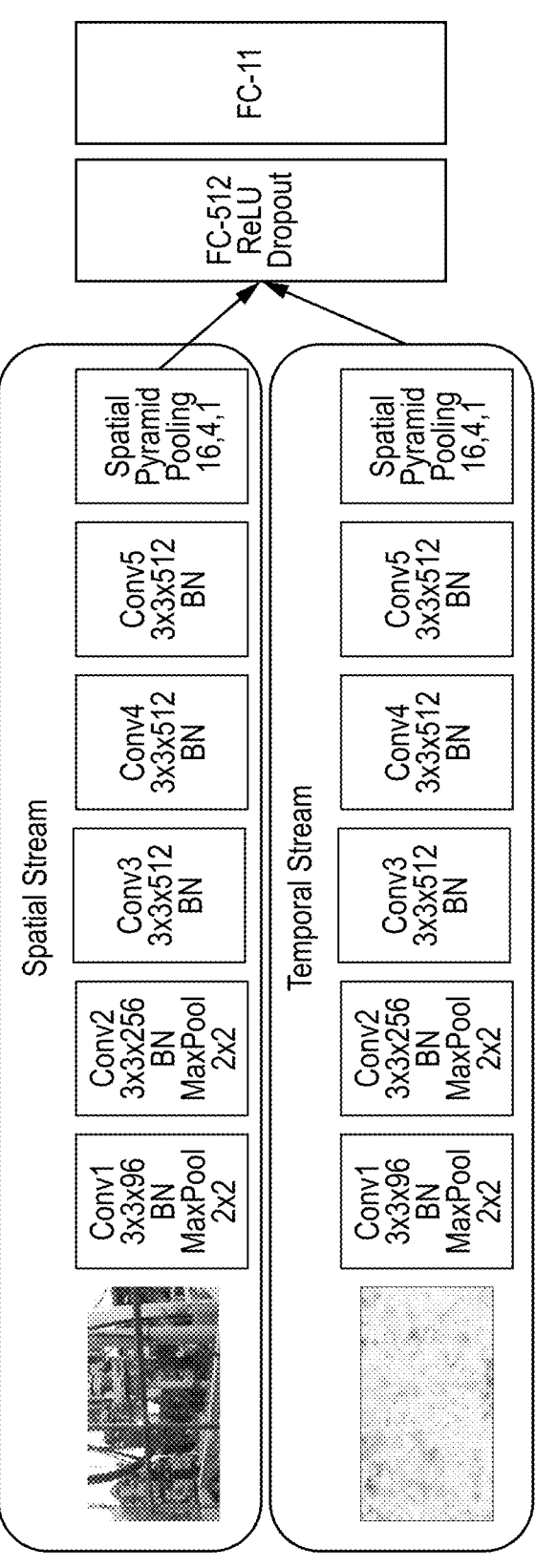
FIG. 7 illustrates a Two-Stream Model architecture, according to an embodiment. The network has a spatial stream that takes as input the images (e.g., video) and a temporal stream that takes as input the optical flow.

The two-stream model has two convolutional neural network branches: one branch takes as input the individual video frame, and the second branch takes as input the optical flow. The features extracted by both branches are concatenated and then fed to a fully connected layer that produces the class prediction. An example of an architecture of the two-stream model is shown schematically in FIG. 7.

Figure 8:
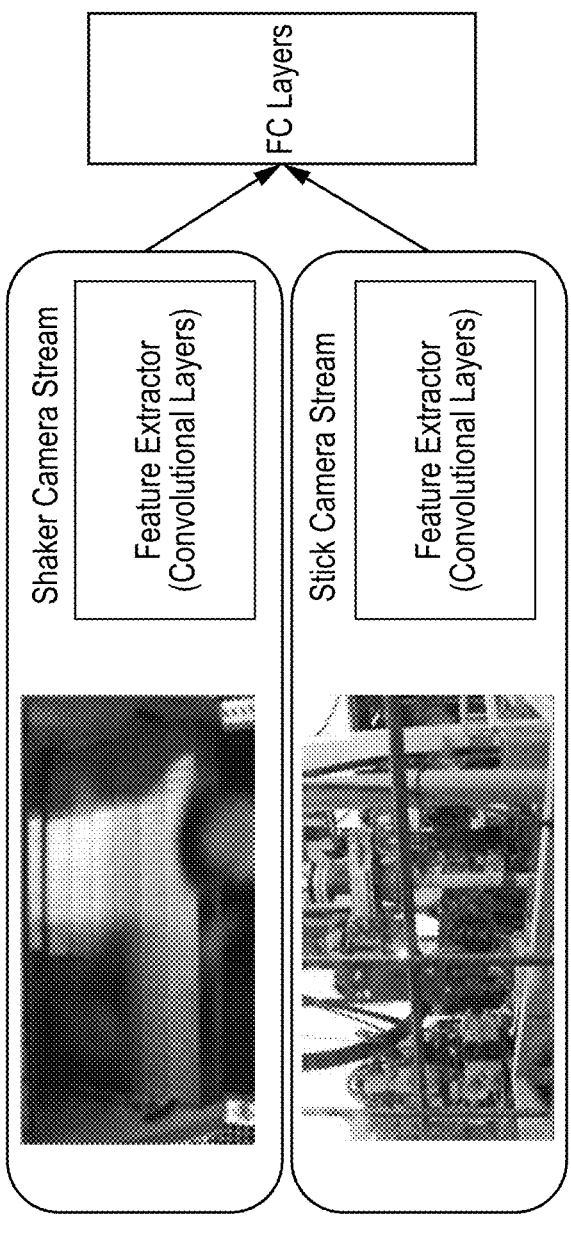
FIG. 8 illustrates a General Dual Architecture. The network takes as input information from both cameras. The Feature extractors and Fully Connected Layers have the same architecture than the regular model. That is, VGG Dual model have the same feature extractor and fully connected layers as the VGG model.

The networks are trained on the stick camera and shaker camera individually in order to compare the amount of information that can be gained from each camera individually. Additionally, the model architecture can be adapted to take as input frames from both cameras. The two-stream architecture scheme, where one branch of the model extracts features from the stick camera and the other extracts features from the shaker camera is adopted, as an example, and may be referred to as a "dual" architecture. FIG. 8 illustrates a general construction of such an architecture.

Implementation

As an example, the model may be trained on one of the first and second datasets, e.g., the February dataset, partitioned as discussed above. The models are built using PyTorch and trained using a GPU or GPU cluster provided, e.g., via a cloud computing platform.

Given that the dataset is imbalanced, per-class F1 score and mean F1 score may be used as a metric to evaluate the models. For a class, the F1 score is defined as:

$$F_1 = \left(\frac{2}{\text{recall}^{-1} + \text{precision}^{-1}}\right) = 2 \cdot \frac{\text{precision} \cdot \text{recall}}{\text{precision} + \text{recall}}.$$

where the precision is the ratio of true positives on number of predicted positives and recall is the ratio of true positives on the number of actual samples. The higher the F1 score, the better the model performs.

In addition to the F1 score, a confusion matrix can be generated for the trained model. The confusion matrix shows where the model gets confused when misclassifying samples. For example, from a confusion matrix for the Shaker Camera model, it can be seen that some of the classes may be confused when they have the same flow information. This shows that while the model is able to distinguish states that have flow from states without flow, the information from the shaker camera may not be sufficient to establish a more fine-grained detection.

Figure 9A:
FIG. 9A illustrates a view from the stick camera taken in a first time period, with a first level of zoom.
Figure 9B:
FIG. 9B illustrates a view from the stick camera taken during a second time period, with a second level of zoom.

After having trained the model on the February Dataset, it may be tested on the January Dataset. While the January Dataset contains a similar distribution of states, the videos are taken in a slightly different angle. In particular the camera pointing on the stick is zoomed in (FIGS. 9A and 9B). Generalization is challenging because of these variations in taking videos between different dates. To improve such generalization, more data may be collected, and the video collection may be made more consistent.

Accordingly, embodiments of the present disclosure may employ deep learning based methods and video information to infer rig states. In particular, in some embodiments, a camera pointing on the stick during drilling operations may enable a model to determine rig states. Accuracy of this determination may be increased by capturing consistent video. For example, consistent viewpoints throughout the video may ensure that the model captures proper features from the image. Further, the camera viewing the stick provides information for the model, from which the rig state may be inferred. Additionally, time extraction from the frames may be employed, or may be avoided by attaching time to each frame in another manner, e.g., to reduce uncertainty present in image-based timestamp recognition.

Example Method

FIG. 10 illustrates a flowchart of a method 1000 for determining rig state, according to an embodiment. The method 1000 may begin by receiving images (e.g., video data) representing a portion of a drilling rig over a first period of time, as at 1002. The images may be captured, as explained above, from one or more locations around a rig, e.g., a camera pointed at the drill pipe ("stick"), at a shaker, and/or elsewhere. These images may be used to train a machine learning model, as will be discussed above, and may thus be referred to as "training" images; however, it will be appreciated that some images of the set may be employed to validate or test the machine learning model, or may be used in the implementation of the machine learning model.

The method 1000 may also include extracting individual images (e.g., frames from the video data), as at 1004. The individual images (frames) may be associated with times, as at 1006. As explained above, to associate the individual images with times, the timestamp on the image may be extracted, e.g., using a neural network that is trained to identify a timestamp in an image, e.g., by a user applying a boundary box to one or more training images. In other embodiments, the time may be otherwise associated with the images (e.g., embedded into the image as data).

In some embodiments, the method 1000 may further include acquiring sensor data representing the rig (e.g., measurements from surface and/or downhole sensors) over the first period of time, as at 1008. The sensor data may be associated with the same times as the images. The sensor data may be employed to determine rig state at the associated times, as at 1010, e.g. based on rules, machine learning, or other techniques. Accordingly, the sensor data may be employed to create a training corpus to train a machine learning model to infer rig states. In another embodiment, the rig state may be determined manually, e.g., by a human expert reviewing the video and identifying rig states, to create the training corpus.

The frames at corresponding times may then be classified (e.g., labeled) based on the determined rig states, as at 1012. In some embodiments, spatio-temporal features of the frames and/or optical flow may also be determined, as at 1014, e.g., for machine learning models able to classify time-varying data.

In some embodiments, the method 1000 may further include training the machine learning model using the classified images and/or the spatio-temporal features or optical flow, as at 1016.

Once the machine learning model is trained, the camera(s) may acquire additional video data representing the portion of the drilling rig at a second period of time, as at 1018. The images acquired at 1018 may be fed to the trained machine learning model, which may classify rig states based on the video data, as at 1020. The classification may be on an individual frame basis, or the machine learning model may additionally or instead use optical flow and/or spatio-temporal data to facilitate the classification. Further, this classification at 1020 may not employ sensor data, or may be employed to augment sensor data.

The classification by the machine learning model at 1020 may be substantially in real-time. That is, as the video is acquired, the rig state may be classified immediately thereafter, such that the second time (i.e., the time period during which the video to be classified is acquired) runs concurrently with its classification at 1020.

Further, the processor that executes the machine learning model may be local to the drilling rig (e.g., in the camera or elsewhere on the drilling rig), or may be remote therefrom, e.g., in an off-site data center. It will be appreciated that predictions of rig state made by the machine learning model may periodically be checked/revised, e.g., in a supervised learning technique so as to refine the model and increase its accuracy. Unsupervised learning techniques may also be employed.

The method 1000 may employ the determined one or more rig states in a variety of ways. For example, logs of drilling activities may be associated with rig state. Moreover, decisions as to drilling parameters and adjustments thereto may be made to respond to drilling conditions, as the rig state may be known in real time.

Computing Environment

Figure 11:
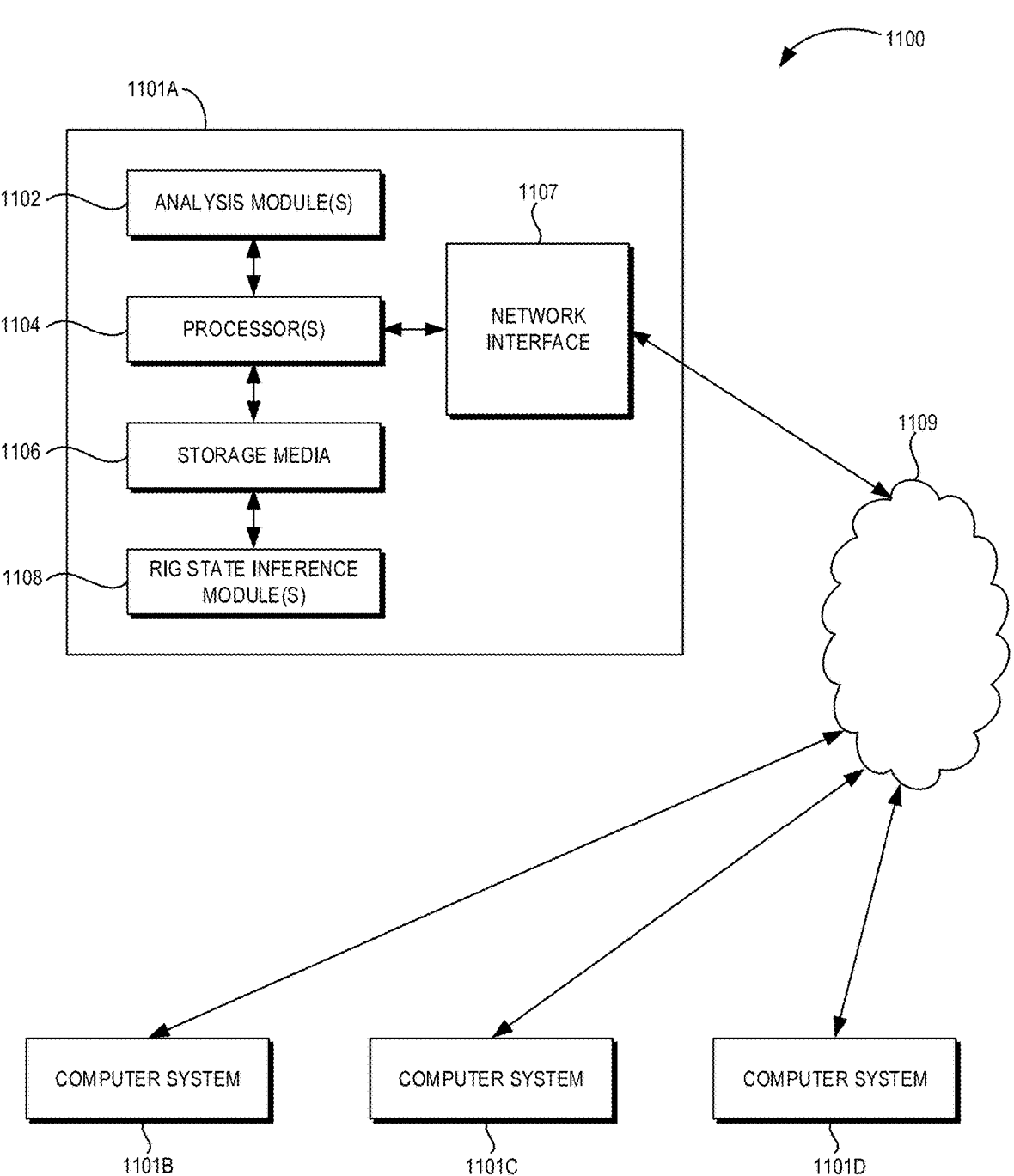
FIG. 11 illustrates a schematic view of a computing system, according to an embodiment.

In some embodiments, the methods of the present disclosure may be executed by a computing system. FIG. 11 illustrates an example of such a computing system 1100, in accordance with some embodiments. The computing system 1100 may include a computer or computer system 1101A, which may be an individual computer system 1101A or an arrangement of distributed computer systems. The computer system 1101A includes one or more analysis modules 1102 that are configured to perform various tasks according to some embodiments, such as one or more methods disclosed herein. To perform these various tasks, the analysis module 1102 executes independently, or in coordination with, one or more processors 1104, which is (or are) connected to one or more storage media 1106. The processor(s) 1104 is (or are) also connected to a network interface 1107 to allow the computer system 1101A to communicate over a data network 1109 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be located in a processing facility, while in communication with one or more computer systems such as 1101C and/or 1101D that are located in one or more data centers, and/or located in varying countries on different continents).

A processor may include a microprocessor, microcontroller, processor module or subsystem, programmable integrated circuit, programmable gate array, or another control or computing device.

The storage media 1106 may be implemented as one or more computer-readable or machine-readable storage media. Note that while in the example embodiment of FIG. 11 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1100 contains one or more rig state inference module(s) 1108. In the example of computing system 1100, computer system 1101A includes the rig state inference module 1108. In some embodiments, a single rig state inference module may be used to perform some aspects of one or more embodiments of the methods disclosed herein. In other embodiments, a plurality of rig state inference modules may be used to perform some aspects of methods herein.

It should be appreciated that computing system 1100 is merely one example of a computing system, and that computing system 1100 may have more or fewer components than shown, may combine additional components not depicted in the example embodiment of FIG. 11, and/or computing system 1100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAS, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1100, FIG. 11), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method, comprising:
   receiving, from a first camera and a second camera positioned on a rig floor of a drilling rig, training images representing a shaker and a stick of the drilling rig;
   associating individual training images of the training images with times at which the individual training images were captured;
   determining a rig state at each of the times;
   classifying the individual training images based on the rig state at each of the times, resulting in classified training images;
   training a machine learning model to identify the rig state using the classified training images;
   acquiring additional images of the shaker and the stick of the drilling rig;
   applying the additional images to the machine learning model to identify a real-time rig state of the drilling rig responsive to the additional images; and
   responsive to the real-time rig state identified by the machine learning model, adjusting a drilling parameter of the drilling rig, wherein the drilling parameter includes rotation per minute of a drill string.

2. The method of claim 1, further comprising receiving sensor data from one or more sensors of the drilling rig, and wherein the rig state at each of the times is determined based at least in part on the sensor data.

3. The method of claim 1, further comprising determining optical flow of the shaker and the stick of the drilling rig, wherein training the machine learning model comprises using the optical flow.

4. The method of claim 1, further comprising determining one or more spatio-temporal features of the shaker and the stick of the drilling rig, wherein training the machine learning model comprises using the one or more spatio-temporal features.

5. The method of claim 1, wherein associating the individual training images with the times at which the individual training images were captured comprises:

drawing a boundary box around a timestamp in at least one of the individual training images; and training a neural network to extract timestamps in other images based on the boundary box drawn around the timestamp in the at least one of the individual training images.

6. The method of claim 1, wherein an amount of information that the first camera gains is different than an amount of information that the second camera gains.

7. The method of claim 6, wherein the first camera has a different angle than the second camera.

8. The method of claim 6, wherein the first camera has a different level of zoom than the second camera.

9. The method of claim 1, further comprising determining optical flow in the training images, resulting in optical flow training images, and wherein training the machine learning model includes training a first neural network branch using the optical flow training images and a second neural network branch using individual frames of the classified training images.

10. The method of claim 1, wherein the drilling parameter includes a hookload of a hook supporting the drill string.

11. A computing system, comprising:

a first camera and a second camera positioned on a rig floor and pointed at a shaker and a stick of a drilling rig, respectively;

one or more processors; and a memory system including one or more non-transitory, computer-readable media storing instructions that, when executed by at least one of the one or more processors, cause the computing system to perform operations, the operations comprising:

receiving, from the first camera and the second camera, training images representing the shaker and the stick of the drilling rig;

associating individual training images of the training images with times at which the individual training images were captured;

determining a rig state at each of the times;

classifying the individual training images based on the rig state at each of the times, resulting in classified training images;

training a machine learning model to identify the rig state using the classified training images;

acquiring additional images of the shaker and the stick of the drilling rig;

applying the additional images to the machine learning model to identify a real-time rig state of the drilling rig responsive to the additional images; and responsive to the real-time rig state identified by the machine learning model, adjusting a drilling parameter of the drilling rig, wherein the drilling parameter includes rotation per minute of a drill string.

12. The system of claim 11, wherein the operations further comprise receiving sensor data from one or more sensors of the drilling rig, and wherein the rig state at each of the times is determined based at least in part on the sensor data.

13. The system of claim 11, wherein the operations further comprise determining optical flow of the shaker and the stick of the drilling rig, wherein training the machine learning model comprises using the optical flow.

14. The system of claim 11, wherein the operations further comprise determining one or more spatio-temporal features of the shaker and the stick of the drilling rig, wherein training the machine learning model comprises using the one or more spatio-temporal features.

15. The system of claim 11, wherein an amount of information that the first camera gains is different than an amount of information that the second camera gains.

16. The system of claim 15, wherein the first camera has a different angle than the second camera.

17. A non-transitory, computer-readable media storing instructions that, when executed by one or more processors of a computing system, cause the computing system to perform operations relative to a drilling rig, a first camera, a second camera, a shaker, and a stick, the operations comprising:

receiving, from the first camera and the second camera positioned on a rig floor of the drilling rig, training images representing the shaker and the stick of the drilling rig;

associating individual training images of the training images with times at which the individual training images were captured;

determining a rig state at each of the times based on sensor data representing one or more rig parameters associated with the times;

classifying the training images based on the rig state at each of the times, resulting in classified training images;

training a machine learning model to identify the rig state using the classified training images;

acquiring additional images of the shaker and the stick of the drilling rig;

applying the additional images to the machine learning model to identify a real-time rig state of the drilling rig responsive to the additional images; and responsive to the real-time rig state identified by the machine learning model, adjusting a drilling parameter of the drilling rig, wherein the drilling parameter includes rotation per minute of a drill string.

18. The non-transitory, computer-readable media of claim 17, wherein the operations further comprise receiving sensor data from one or more sensors of the drilling rig, and wherein the rig state at each of the times is determined based at least in part on the sensor data.

19. The non-transitory, computer-readable media of claim 17, wherein the operations further comprise determining optical flow of the shaker and the stick of the drilling rig, wherein training the machine learning model comprises using the optical flow.

* * * * *